United States Patent

Preisler

[15] 3,640,459
[45] Feb. 8, 1972

[54] SKIDPROOF TRACTION MAT FOR AUTOMOTIVE VEHICLES

[72] Inventor: Samuel L. Preisler, 3210 Avenue H, Brooklyn, N.Y. 11229

[22] Filed: May 13, 1970

[21] Appl. No.: 36,806

[52] U.S. Cl. ...................... 238/14, 180/90.6, 296/1 F
[51] Int. Cl. .................... B62d 55/08, E01b 23/00
[58] Field of Search .................................. 238/14; 152/208–210; 15/215; 180/90.6; 296/1 F

[56] References Cited

UNITED STATES PATENTS

| | | | |
|---|---|---|---|
| 1,339,612 | 5/1920 | Wilkins | 238/14 |
| 3,125,147 | 3/1964 | Hakka | 152/210 |
| 1,425,101 | 8/1922 | Jury | 238/14 |
| 3,350,013 | 10/1967 | Bergquist | 238/14 |
| 1,082,449 | 12/1913 | Smith | 238/14 |
| 1,815,435 | 7/1931 | Harding et al. | 238/14 |
| 2,577,890 | 12/1951 | Hardy | 238/14 |

FOREIGN PATENTS OR APPLICATIONS

| | | | |
|---|---|---|---|
| 735,243 | 5/1966 | Canada | 152/210 |
| 1,013,431 | 12/1965 | Great Britain | 152/210 |

*Primary Examiner*—Arthur L. La Point
*Assistant Examiner*—Richard A. Bertsch
*Attorney*—Polachek & Saulsbury

[57] ABSTRACT

A traction pad for an automotive vehicle having pneumatic tires, that comprises a flat, flexible mat formed with transverse treads on its upper surface. Studs embedded in the mat extend out of the smooth bottom surface of the mat for engagement with a slippery roadway. The mat is rectangular and has long beveled side and end edges to provide an incline on which the wheel can roll. Each stud has a cylindrical body with a reduced diameter cylindrical pin portion extending outwardly axially of one end thereof. Ridges are provided on the bottom surface between rows of protruding stud pin portions to cooperate with the studs in holding the mat in place on the roadway. The ridges elevate the pin portions from the carpet on the floor of the vehicle when the pad is stored thereover and being used as mat thereupon. Draglines may be attached to an end of the mat.

3 Claims, 10 Drawing Figures

INVENTOR.
SAMUEL L. PRIESLER

BY Polachek & Saulsbury
ATTORNEYS

PATENTED FEB 8 1972

INVENTOR.
SAMUEL L. PRIESLER
BY Polachek & Saulsbury
ATTORNEYS

SKIDPROOF TRACTION MAT FOR AUTOMOTIVE VEHICLES

This invention concerns improved traction pads especially adapted for putting under wheels of a vehicle for extricating the driving wheels of the vehicle from ruts in mud, snow, sand, ice, and the like or slippery roadway.

Traction pads, heretofore, known have been formed with rubber treads which fail to penetrate the ground sufficiently, or which fail to obtain a nonslip grip upon the ground. Some traction pads have rather complicated structures which are difficult and costly to manufacture. Others have treads which are subject to tearing off or to wear, and which cannot be replaced, thus making the traction pad unusable.

The present invention is directed at overcoming the above and other difficulties and disadvantages of prior traction pads. A new and improved pad is provided which can be economically manufactured, and which provides improved traction to extricate a vehicle from a slippery road condition where driving traction has been lost. According to the invention, there is provided a flexible molded rubber or plastic pad having beveled side and end edges on which the vehicle wheel can roll on the top surface of the pad. The top of the pad has traction ridges or treads which engage the tire of a vehicle in a friction grip. The bottom surface of the pad has a multiplicity of spaced and staggered studs projecting downwardly to engage in the slippery surface of the roadway. One or more draglines can be attached between the pad and the frame of a vehicle while the vehicle rests on the pad. The weight of the vehicle forces the studs into the ground to effect positive traction so that the vehicle can be driven quickly and safely out of a slippery hole or depression in a roadway. The pad can be stored on the vehicle carpet without harm to the carpet and used as a mat thereupon.

Other and further features, objects and advantages of the invention will become apparent from the following detailed description taken together with the drawing, wherein.

Figure 1:
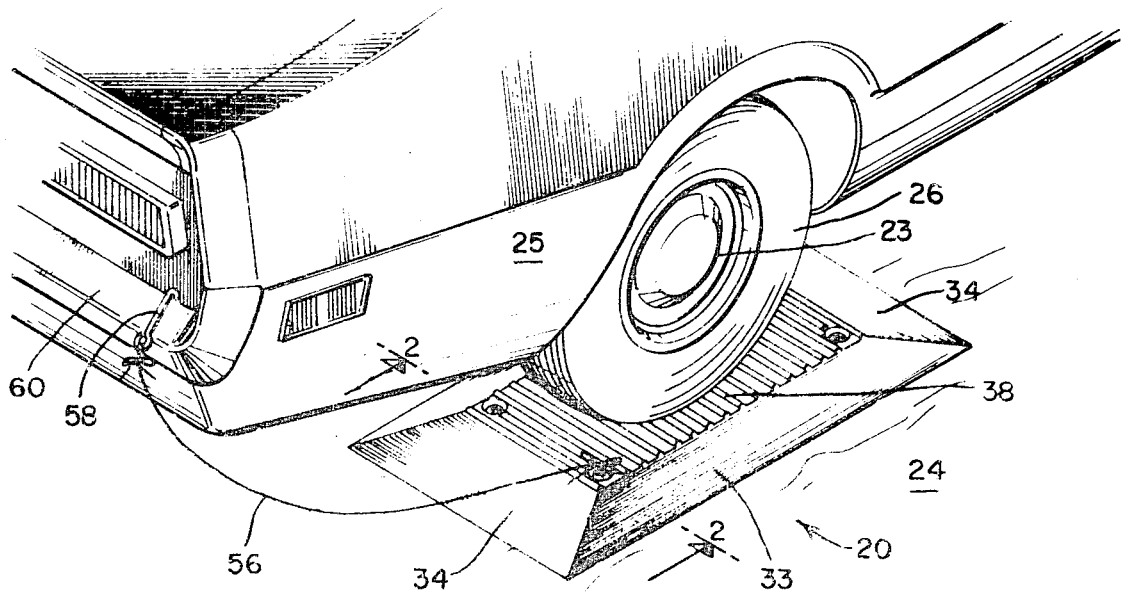
FIG. 1 is a perspective view of a traction pad embodying the invention shown disposed under a rear vehicle wheel on a slippery roadway.
Figures 2, 3:
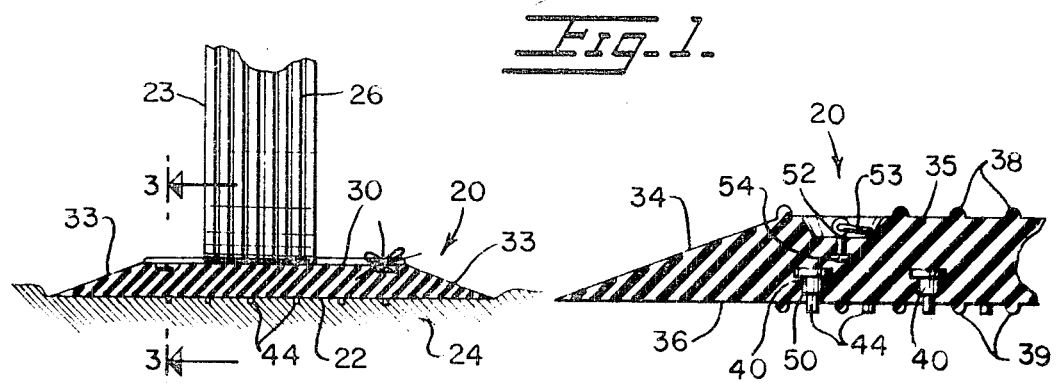
FIG. 2 is a sectional view of the pad taken on line 2—2 of FIG. 1.
FIG. 3 is an enlarged fragmentary longitudinal sectional view of the traction pad taken on line 3—3 of FIG. 2.
Figure 4:
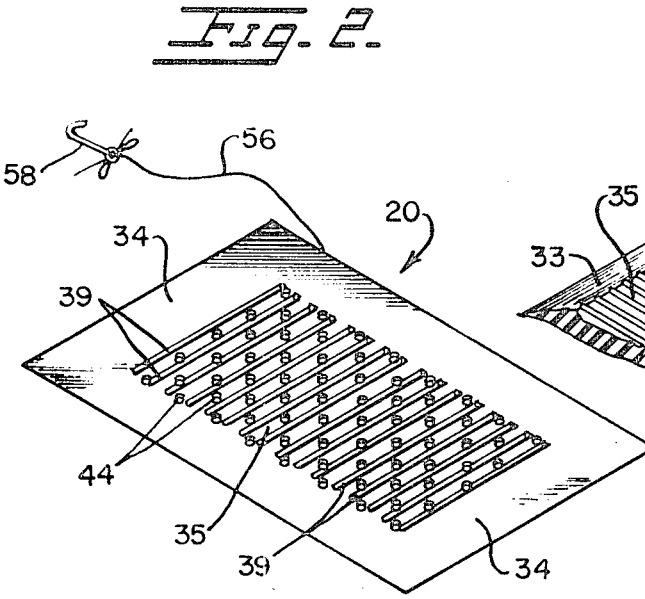
FIG. 4 is a bottom perspective view of the traction pad and the dragline.

Referring first to FIGS. 1 and 2, there is shown a rectangular traction pad or mat 20 located on a slippery roadway 24. The pad is disposed under the wheel 23 of a vehicle 25 such as an automobile. The pneumatic tire 26 bears on top of the pad. The sides and ends 32 of the pad have the inclined surfaces 33, 34. The construction of the pad is shown to best advantage in FIGS. 3–7 to which reference is now made.

This pad or mat is flat, flexible and elastic, being made of natural or artificial rubber, a synthetic elastomer, or a resilient plastic, molded into a one-piece body and generally rectangular in plan view. End and lateral edges 32 of the mat are beveled inwardly from the upper surface 35 to the bottom surface 36. The upper surface is formed with a multiplicity of transversely extending ridges or treads 38 to improve traction. The bottom surface 36 of the mat is smooth but is formed with integral, resilient, parallel, transverse ridges 39.

Figure 5:
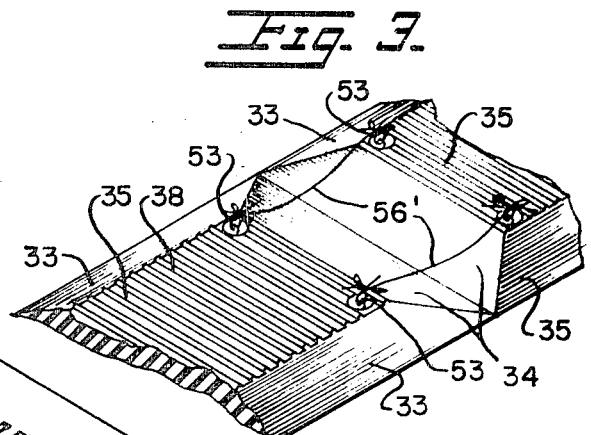
FIG. 5 is a fragmentary top perspective view of two pads joined together in tandem relationship by their draglines.
Figure 6:
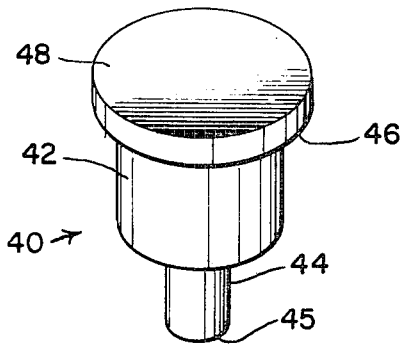
FIG. 6 is a top perspective view of one of the traction studs.
Figure 7:
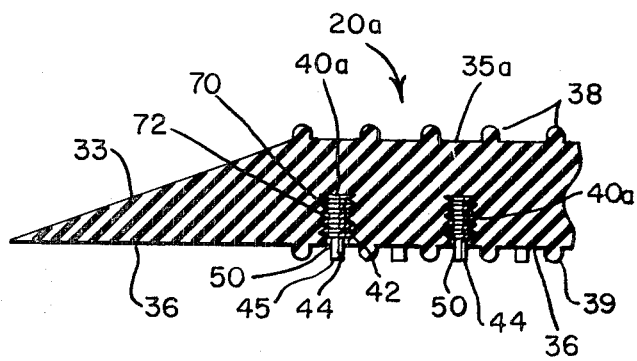
FIG. 7 is a fragmentary longitudinal sectional view of a traction pad in upright position using a modified stud.

The pad 20 further comprises a multiplicity of rigid studs 40 embedded in the body of the mat and protrude from the bottom surface 36. As best shown in FIGS. 5, 6 and 7, each stud 40 has a cylindrical body 42 and a reduced diameter cylindrical pin portion 44 that extends axially outwardly from the bottom surface 36. The pin has a flat outer, free end 45. A radial annular flange 48 is formed as a head on the other end of body 42. The body and flange of each stud are embedded in a hole 50 in the mat. Pin portion 44 extends outwardly perpendicularly to the flat bottom surface 36. Ends of the pin portions are almost coplanar with the bottoms of ridges 39 as shown in FIG. 3.

An eyebolt or rivet 52 can be secured in a hole 54 at each corner of the upper surface of the mat for securing by a loop 53 a dragline 56 thereto. The dragline can terminate in a hook 58 for engaging a rear bumper 62 of the vehicle 25 as shown in FIG. 1. Two similar draglines can be provided if desired as shown in FIG. 5. The draglines will hold the mat in place while the tire 26 rolls forwardly off the mat and will pull the mat along with the vehicle.

The mat is made by any conventional rubber or plastic molding process. The beveled edges 33, 34, and ridges or treads 38, 39 are all integrally formed on the top and bottom surfaces. In addition a multiplicity of holes 50 are formed which originally have diameters substantially equal to those of reduced diameter cylindrical pin portions 44 of the studs 40. By the use of suitable dilators or spreaders the holes are temporarily expanded and the studs are inserted axially in the expanded holes. The spreaders are removed and the resilient, elastic material of the mat contracts around the studs leaving only the pin portions 44 projecting axially from the smooth bottom surface 36. The studs are disposed in rows and in spaced staggered array with each other. These studs will dig into the slippery ground under the weight of a vehicle, and in addition the flat bottom of the mat will stick by suction to the slippery ground, to enable the vehicle to be driven quickly and safely under its own power, out of any depression or slippery surface in which it may be stuck. Ridges 39 will be somewhat flattened by the weight of the vehicle, but will cooperate with the studs in holding the pad in place on the ground.

The pad 20 is placed under the wheel 23 by disposing the pad at the front of the wheel. One beveled end edge will be wedged between the tire and the ground. When the wheel is turned, the pad will be pulled and the tire will ride up the inclined surface and the studs 40 will be forced into the ground. Ridges 39 will cooperate with the studs in holding the pad in place. The pad will remain stationary while the wheel 23 rolls off the pad. If a second pad is needed for along slippery surface draglines 56' as shown in FIG. 5 can join two pads 20 together in tandem relationship.

The pad is flexible enough to be rolled up. Alternatively it can be stored in the trunk of an automobile, or it can be placed on the floor inside the vehicle forward of the front or rear seats to serve as a mat. The lateral beveled edges 33 extend down to the floor of the vehicle. There, the pad will serve as a protector for the floor covering. The bottom surface ridges 39 will help to keep the stud pin portion 44 from cutting into the floor covering. The draglines are attached to the vehicle, and the pad can be quickly and easily placed under the slipping wheel which lacks driving traction.

Figure 8:
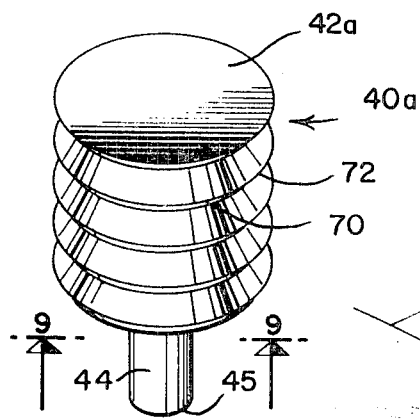
FIG. 8 is a top perspective view of the modified stud free of the pad.
Figure 9:
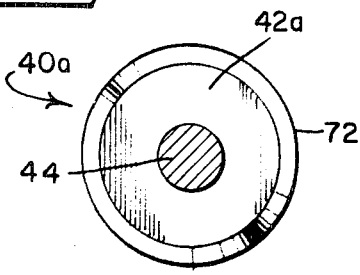
FIG. 9 is a transverse sectional view of the traction stud taken on line 9—9 of FIG. 8.
Figure 10:
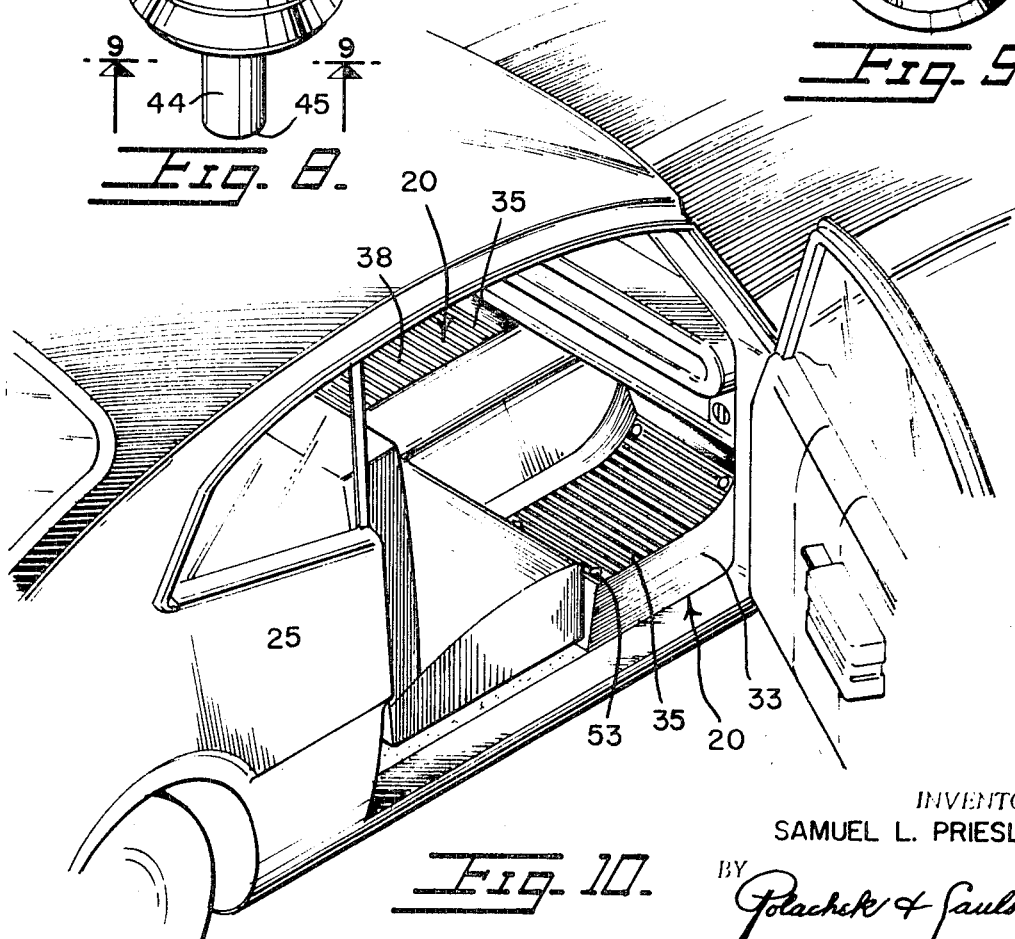
FIG. 10 is a perspective view showing the pad being used as a floor cover in the front compartment of a vehicle.

FIGS. 7, 8 and 9 show an alternate form of stud 40a in which cylindrical body 42a has circumferential grooves and ridges 70, 72 to lock in a hole 50a in the mat 35a of pad 20a. Pin portion 44 has a flat end face 45 and extends outwardly of the flat bottom surface 36 of mat 35a as shown in FIG. 7.

If the pin portion 44 of a stud 40 or 40a should become damaged or worn, the hole 50 or 50a can be spread with the spreader and the remaining stud can be pulled out of the hole. Another new stud can be inserted in the hole as it is spread and then the spreader will be removed to complete the repair. The flexible, elastic material will close around the new stud and will lock it in place as it did with the worn stud.

The pads 20 described can be manufactured at relatively low cost by mass production machinery and methods. The pads will give long, trouble-free satisfactory service, and will improve the safety of automotive vehicle operation. The pads can be manufactured in different sizes. Larger pads and studs will be used for vehicles of heavier weights. The traction pads can be used by many types of wheeled vehicles such as trucks and buses in addition to automobiles.

What is claimed is:

1. A traction pad for an automotive vehicle having pneumatic tires, comprising a flat, flexible mat made of elastic, resilient material, said mat having flat top and bottom surfaces with a multiplicity of staggered, blind holes formed in the bottom of the mat, said mat being formed with integral, resilient, transverse, parallel ridges on the top surface of frictionally engaging a tire; a multiplicity of rigid studs partially embedded in the holes respectively in the bottom of the mat, each stud having an axial length less than the thickness of the mat for seating in a hole therein, each stud having a head at one end, a cylindrical body integral with the head, and an integral pin portion of reduced diameter extending axially outward of the cylindrical body, said studs being partially inserted in said holes with the heads and bodies removably engaged in the holes and with the ends of the pin portions extending out of the bottom surface of the mat for digging into and gripping the ground under the weight of the vehicle on the mat; and a plurality of other integral, resilient, transverse parallel ridges on the bottom surface of the mat between said pin portions of the studs, ends of the pin portions being substantially coplanar with said other ridges for cooperation therewith in holding the mat stationary on slipper ground, said ridges being compressible so that the flat bottom surface of the mat between the studs grips the ground by suction when the weight of the vehicle rests on the mat.

2. A traction pad as defined in claim 1, wherein said mat is rectangular in plan and has beveled upper end edges slanted outwardly from the top to bottom surfaces to facilitate driving the vehicle on and off the mat, said mat further having lateral beveled edges for snugly fitting on the floor of the interior of the vehicle when the mat is stored thereon.

3. A traction pad as defined in claim 1, wherein the cylindrical body of each stud is formed with circumferential grooves and further ridges to lock the studs in the holes in the mat.

* * * * *